United States Patent
Amadieu et al.

(10) Patent No.: US 11,367,017 B2
(45) Date of Patent: Jun. 21, 2022

(54) DEVICE, SYSTEM AND METHOD FOR TRAINING MACHINE LEARNING MODELS USING MESSAGES ASSOCIATED WITH PROVIDER OBJECTS

(71) Applicant: AMADEUS S.A.S., Biot Sophia Antipolis (FR)

(72) Inventors: Olivier Amadieu, Biot (FR); Philippe Beaudequin, Biot (FR); Jean-Marie Cazorla, Biot (FR); Nicolas Maillot, Biot (FR); Christian Haas-Frangi, Biot (FR)

(73) Assignee: AMADEUS S.A.S., SOPHIA ANTIPOLIS, Biot (FR)

( * ) Notice: Subject to any disclaimer, the term of this patent is extended or adjusted under 35 U.S.C. 154(b) by 334 days.

(21) Appl. No.: 16/656,820

(22) Filed: Oct. 18, 2019

(65) Prior Publication Data

US 2021/0117850 A1    Apr. 22, 2021

(51) Int. Cl.
*G06N 20/00* (2019.01)
*H04L 67/568* (2022.01)
(Continued)

(52) U.S. Cl.
CPC .......... *G06N 20/00* (2019.01); *G06F 40/295* (2020.01); *G06F 40/30* (2020.01); *H04L 67/2842* (2013.01)

(58) Field of Classification Search
CPC ....... G06N 20/00; G06F 40/295; G06F 40/30; G06F 40/143; H04L 67/2842
See application file for complete search history.

(56) References Cited

U.S. PATENT DOCUMENTS 10,984,446 B1 * 4/2021 Becker ................. G06N 20/00
2019/0034483 A1 * 1/2019 Millius ................. G06F 16/335
(Continued)

FOREIGN PATENT DOCUMENTS

WO    WO-0161505 A1    8/2001
WO    WO-2018231187 A1    12/2018

OTHER PUBLICATIONS

Goldberg, Yoav. "A primer on neural network models for natural language processing." Journal of Artificial Intelligence Research 57 (2016): 345-420.

*Primary Examiner* — Caroline H Jahnige
(74) *Attorney, Agent, or Firm* — Perry + Currier, Inc.

(57) ABSTRACT

A device, system and method for training machine learning models using messages associated with provider objects is provided. One or more computing devices: receives messages associated with provider objects representing items provided by provider systems, the messages having more than one format; stores harmonized objects corresponding to the messages, the harmonized objects generated using mappings of harmonized data of the harmonized objects to message data of the messages, the harmonized objects having common formats for a harmonized object type; extracts, from the harmonized objects, for a given machine learning model, given machine learning training data; generates, for the given machine learning model, using the given machine learning training data, at least one machine learning classifier; and provides the at least one machine learning classifier to the given machine learning model at one or more servers configured to implement the given machine learning model on received provider objects.

20 Claims, 7 Drawing Sheets

(51) Int. Cl.
  *G06F 40/30* (2020.01)
  *G06F 40/295* (2020.01)

(56) References Cited

U.S. PATENT DOCUMENTS

2019/0272479 A1* 9/2019 Mars .................... G06N 3/0445
2020/0211077 A1* 7/2020 He ...................... G06Q 30/0611

* cited by examiner

DEVICE, SYSTEM AND METHOD FOR TRAINING MACHINE LEARNING MODELS USING MESSAGES ASSOCIATED WITH PROVIDER OBJECTS

FIELD

The specification relates generally to machine learning, and specifically to a device, system and method for training machine learning models using messages associated with provider objects.

BACKGROUND

The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) standard in the context of travel-related products), they may nonetheless employ different mechanisms to initiate the exchange of data.

SUMMARY

An aspect of the specification provides a method comprising: receiving, at one or more computing devices, messages associated with provider objects representing items provided by one or more provider systems, the messages having more than one format; storing, at one or more memories, harmonized objects corresponding to the messages, the harmonized objects generated using one or more mappings of harmonized data of the harmonized objects to message data of the messages, the harmonized objects having common formats for a harmonized object type; extracting, at the one or more computing devices, from the harmonized objects, for a given machine learning model, given machine learning training data; generating, at the one or more computing devices, for the given machine learning model, using the given machine learning training data, at least one machine learning classifier; and providing, by the one or more computing devices, the at least one machine learning classifier to the given machine learning model at a server configured to implement the given machine learning model on received provider objects.

Another aspect of the specification provides a computing device comprising: one or more memories; a communication interface; and a controller configured to: receive, via the communication interface, messages associated with provider objects representing items provided by one or more provider systems, the messages having more than one format; store, at the one or more memories, harmonized objects corresponding to the messages, the harmonized objects generated using one or more mappings of harmonized data of the harmonized objects to message data of the messages, the harmonized objects having common formats for a harmonized object type; extract, from the harmonized objects, for a given machine learning model, given machine learning training data; generate, for the given machine learning model, using the given machine learning training data, at least one machine learning classifier; and provide, via the communication interface, the at least one machine learning classifier to the given machine learning model at one or more servers configured to implement the given machine learning model on received provider objects.

Another aspect of the specification provides a non-transitory computer-readable medium storing a computer program, wherein execution of the computer program is for: receiving, at one or more computing devices, messages associated with provider objects representing items provided by one or more provider systems, the messages having more than one format; storing, at one or more memories, harmonized objects corresponding to the messages, the harmonized objects generated using one or more mappings of harmonized data of the harmonized objects to message data of the messages, the harmonized objects having common formats for a harmonized object type; extracting, at the one or more computing devices, from the harmonized objects, for a given machine learning model, given machine learning training data; generating, at the one or more computing devices, for the given machine learning model, using the given machine learning training data, at least one machine learning classifier; and providing, by the one or more computing devices, the at least one machine learning classifier to the given machine learning model at a server configured to implement the given machine learning model on received provider objects.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
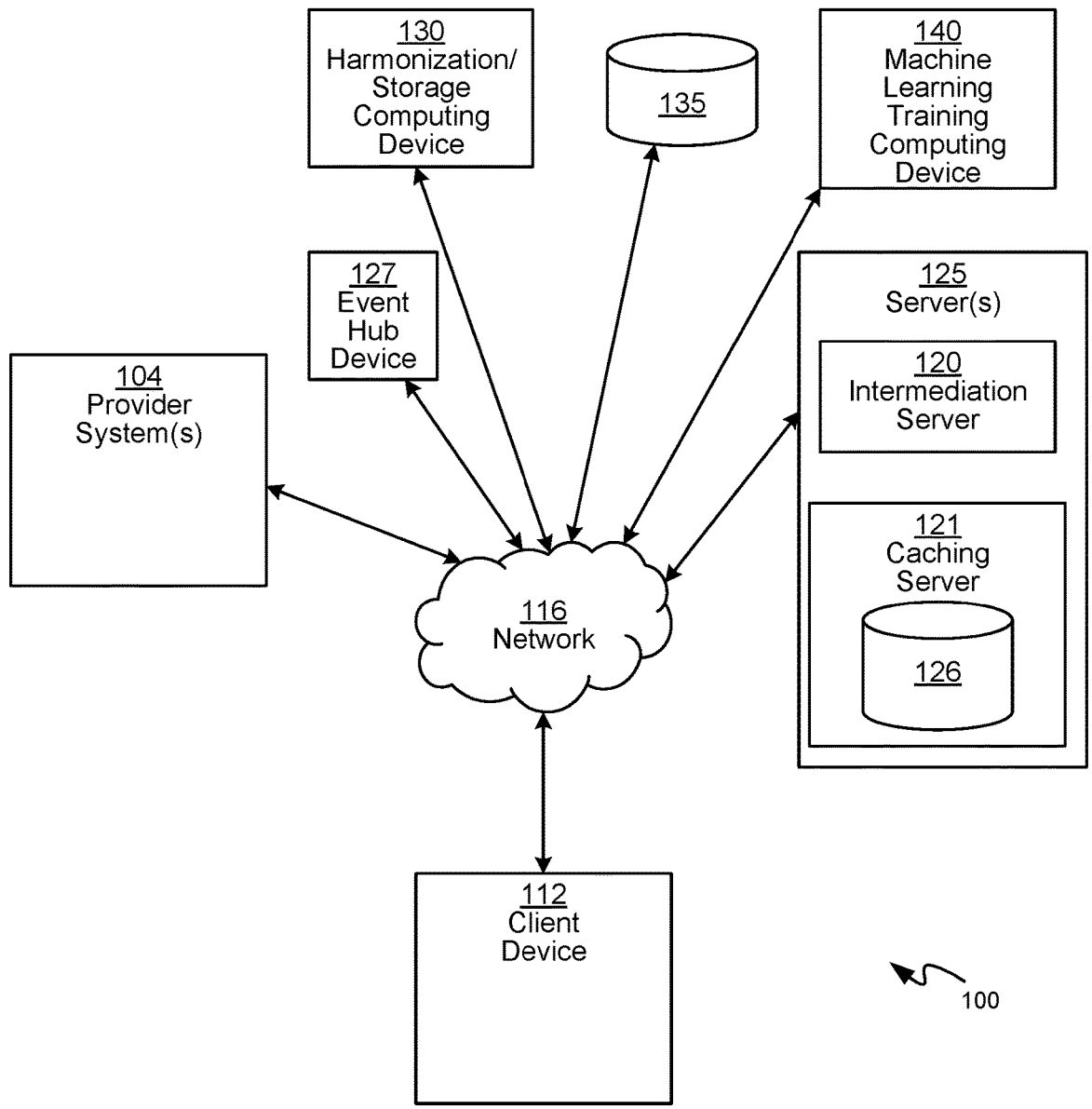
FIG. 1 depicts a system for training machine learning models using messages associated with provider objects, according to non-limiting examples.

FIG. 1 depicts a system 100 for training machine learning models using messages associated with provider objects. The provider objects, in the examples discussed herein, may comprise data objects and/or data records which correspond to products and/or items, such as travel-related goods and services (e.g. flights, hotel reservations, car rentals and the like), provided by a provider system. More specifically, the products and/or items discussed in the examples below may be flight tickets and related services (e.g. baggage check services, in-flight food, entertainment and the like). However, the systems and methods discussed below can also be applied to various other types of data objects and/or items.

Delivery of the items mentioned above is typically controlled by a provider entity, such as an airline in the case of the items discussed in connection with the examples provided herein. The system 100 includes one or more provider systems 104 (e.g. one or more servers or other suitable computing devices), which in this example is operated by one or more provider entities. The system 100 can include a plurality of provider systems 104, each operated by respective provider entities (e.g. other airlines), although only one provider system 104 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 104.

Each provider object defines an item, or a combination of items, which may be offered for purchase (e.g. by end users of the items) including, but not limited to one or more of flights, train rides, hotel stays, airport lounge access, seat upgrades, baggage check services, in-flight food, entertainment and the like.

In the examples discussed below, each provider object may define a flight operated by the provider entity, and/or ancillary services associated with the flight. Each provider object therefore contains various fields. Certain fields define item attributes, such as product object identifiers (e.g. service identifiers, item identifiers, product identifiers and the like), locations, dates and times corresponding to the products (e.g. flight times and other itinerary data). The type of fields and/or data of a provider object may depend on a type of a provider object. For example, provider objects corresponding to flights may include flight identifiers, whereas provider objects corresponding to other travel-related items, such as an offer for a train ride, a hotel, accessing an airport lounge and/or an offer for a premium seat upgrade, may include information related to the train ride, the hotel, the lounge, the premium seat, etc.

As will be described below, the system 100 further comprises a network 116 and an intermediation server 120. The network 116 comprises any suitable combination of local and wide area networks, including the Internet, such that the components of the system 100 may communicate. The intermediation server 120 generally intermediates between the client device 112 and the provider system 104, for example such that the client device 112 may request products from the provider system 104, and/or more than one provider system 104, via the intermediation server 120.

As depicted, the system 100 further comprises a caching server 121, which caches and/or stores provider objects received from various sources in the system 100 including, but not limited to, the provider system 104. As will be explained below, the caching server 121 further provides responses that include provider objects stored at a cache to a requesting device, such as the client device 112, for example via the intermediation server 120. While the servers 120, 121 may be two separate devices, the functionality of the servers 120, 121 may be combined into one server 125 and/or implemented in a cloud computing environment using a plurality of servers and/or one or more servers. The servers 120, 121 may be referred to hereafter as the one or more servers 120, 121.

As depicted, the caching server 121 maintains a cache and/or a memory 126, which may be implemented as one or more memories. The memory 126 contains provider objects as received at the caching server 121 from various sources of provider objects in the system 100. The caching server 121 may implement machine learning models to categorize provider objects by one or more of reusability and context characteristics, and store the provider objects at the memory 126 as categorized; the caching server 121 may further determine whether a stored and categorized provider object is currently valid, as described in more detail below. The one or more servers 120, 121 may respond to requests for items provided by the provider system 104 using provider objects stored at the memory 126, for example to reduce time to respond to a request.

Functionality of the one or more servers 120, 121 is described in Applicant's co-pending application titled "DEVICE, SYSTEM AND METHOD FOR PROVIDING PROVIDER OBJECTS FROM A CACHE", having an applicant docket number PT2165WWDR, filed on a same day as the present specification, and incorporated herein by reference.

The client device 112, in the present example, may be operated by a travel agent entity, and therefore generates and transmits requests for provider objects (e.g. representing products which may be for purchase), to the provider system 104, via the intermediation server 120, on behalf of end users (e.g. travelers). The system 100 can include a plurality of client devices 112, although only one client device 112 is shown in FIG. 1 for illustrative purposes. Put another way, the intermediation server 120 intermediates between the client device 112 and the provider system 104 and receives requests from the client device 112.

In general, requesting and/or ordering items represented by provider objects occur in the system 100 via exchange of messages, for example between the intermediation server 120 and the provider system 104. Such messages may hence be associated with provider objects, and may include messages for one or more of: requesting provider objects; requesting further information associated with provider objects; providing provider objects; ordering items represented by provider objects, and the like.

As depicted, the system 100 further comprises an event hub device 127, which may receive messages associated with provider objects, from the provider system 104. The event hub device 127 may comprise a proxy for at least the intermediation server 120 such that messages received by at least the intermediation server 120 are received at the event hub device 127. For example, when the provider system 104 transmits a message and/or a response to the intermediation server 120 that includes a provider object, the message and/or the response may first be received at the event hub device 127 and then transmitted to the intermediation server 120. Put another way, when provider objects are requested from a provider system, the provider objects may be pushed to the event hub device 127 to make them accessible to other components of the system 100, other than a current instance of the intermediation server 120, as described in more detail below. Indeed, the event hub device 127 may be configured to receive messages and/or responses that include provider objects from all provider systems 104 of the system 100. Such "traffic" may be "live" and include messages generated due to provider objects requested by the client device 112. However, in other examples, such traffic may not be "live"; in these examples, a component of the system 100, such as a traffic generator, which may be a component of the intermediation server 120 and/or a separate component, and the like, may automatically and/or periodically request provider objects from one or more provider systems 104 via messages, for example to have a record of offers for flights to given locations on particular days; such requests may be transmitted and/or triggered by the intermediation server 120.

As depicted, the system 100 further comprises a computing device 130 which receives, from the event hub device 127, the messages received at the event hub device 127 as described above. The event hub device 127 may further provide provider objects to the caching server 121 for storage at the memory 126.

As depicted, the system 100 further comprises one or more memories 135 which, as depicted, may comprise a database. While the one or more memories 135 is depicted as a standalone component of the system 100, the one or more memories 135 may be component of a computing device, such as the computing device 130 and/or a computing device 140 and/or another computing device (e.g. for maintaining the one or more memories 135). For simplicity, the one or more memories 135 are interchangeably referred to hereafter as the memory 135.

The computing device 130 generally formats (e.g. translates, and the like) the messages received from the event hub device 127 into harmonized objects and/or data objects, the harmonized objects generated using one or more mappings of harmonized data of the harmonized objects to messages data of the messages, the harmonized objects having common formats for a harmonized object type. Functionality of the computing device 130 will be described in more detail below. The computing device 130 further stores the harmonized objects at the memory 135. As such, the computing device 130 may referred to as a harmonization/storage computing device 130.

The system 100 further comprises the computing device 140 for training machine learning models using the messages associated with provider objects, and in particular using the harmonized objects stored at the memory 135. In particular, the computing device 140 may be configured to: extract, from the harmonized objects, for a given machine learning model, given machine learning training data, generate, for the given machine learning model, using the given machine learning training data, at least one machine learning classifier; and provide the at least one machine learning classifier to the given machine learning model implemented at the caching server 121 on received provider objects. As such, the computing device 140 may referred to as a machine learning training computing device 140. Hence, as used herein the term machine learning model may to refer to a mathematical model which is based on sample data, known as training data and/or a training dataset and/or (herein) as machine learning training data, in order to make predictions and/or decisions for a given task without being explicitly programmed to perform the given task; for example a machine learning model may implement a machine learning classifier which performs the given task. A machine learning training algorithm, as used herein, may refer to an algorithm which builds and/or trains a machine learning model, for example by generating machine learning classifiers, using a training data and/or a training dataset and/or (herein) machine learning training data. Hence, the computing device 140 may implement machine learning training algorithms to generate machine learning classifiers to "train" a machine learning model.

Before discussing the functionality of the system 100 in greater detail, certain components of the computing devices 130, 140 will be discussed in greater detail with reference to FIG. 2 and FIG. 3. While depicted as two separate devices, the devices 130, 140 may comprise one or more computing devices and/or one or more cloud computing devices that may be geographically distributed. The computing device 130 will first be described with respect to FIG. 2.

Figure 2:
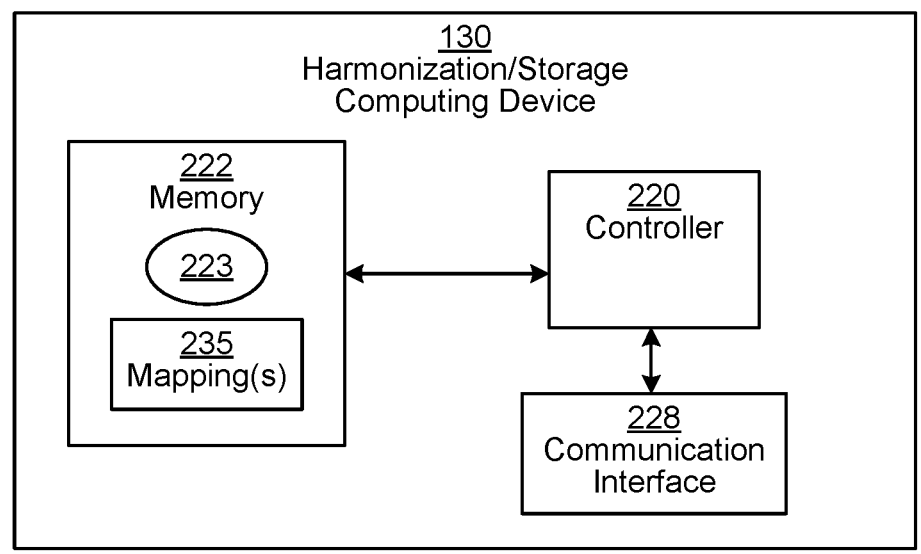
FIG. 2 depicts a computing device configured to harmonize and store messages associated with provider objects, according to non-limiting examples.
Figure 3:
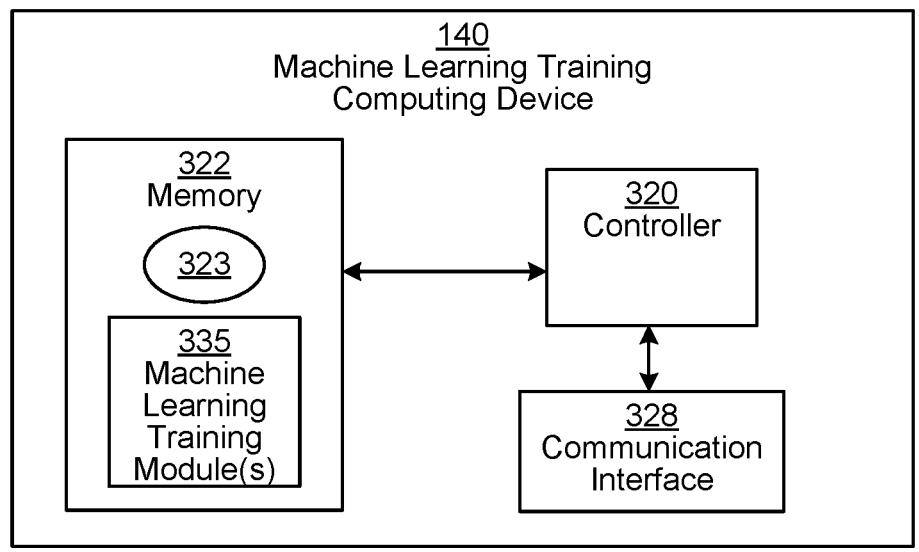
FIG. 3 depicts a computing device used for training machine learning models using messages associated with provider objects, according to non-limiting examples.

As shown in FIG. 2, the computing device 130 includes at least one controller 220, such as a central processing unit (CPU) or the like. The controller 220 is interconnected with a memory 222 storing an application 223, the memory 222 implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 220 and the memory 222 are generally comprised of one or more integrated circuits (ICs).

The controller 220 is also interconnected with a communication interface 228, which enables the computing device 130 to communicate with the other components of the system 100 (i.e. the event hub device 127) via the network 116. The communication interface 228 therefore includes any necessary components (e.g. network interface controllers (NICs), radio units, and the like) to communicate via the network 116. The specific components of the communication interface 228 are selected based on upon the nature of the network 116. The computing device 130 can also include input and output devices connected to the controller 220, such as keyboards, mice, displays, and the like (not shown).

The components of the computing device 130 mentioned above can be deployed in a single enclosure, or in a distributed format. In some examples, therefore, the computing device 130 includes a plurality of processors, either sharing the memory 222 and communication interface 228, or each having distinct associated memories and communication interfaces.

While not depicted, the memory 222 may include the memory 135 (and/or a portion thereof). However, in other examples, memory 135 may be external to the computing device 130, and accessible to the controller 220, for example via the communication interface 228. Indeed, the memory 135 may be distributed between and/or shared with the computing device 140.

The memory 222 also stores a plurality of computer-readable programming instructions, executable by the controller 220, in the form of various applications, including the application 223. As will be understood by those skilled in the art, the controller 220 executes the instructions of the application 223 (and any other suitable applications) in order to perform various actions defined by the instructions contained therein. In the description below, the controller 220, and more generally the computing device 130, are said to be configured to perform those actions. It will be understood that they are so configured via the execution (by the controller 220) of the instructions of the applications stored in memory 222.

As depicted, the memory 222 further stores mappings 235 between the messages and the harmonized objects. For example, the mappings 235 may map fields and/or message data of the messages to corresponding fields and/or harmonized object data of the harmonized objects. Indeed, the harmonized object generally have a common format for a harmonized object type. For example, messages representing responses for provider objects may have different formats depending on a source of a response, whether a response is in an NDC or GDS format, and the like, while harmonized objects representing the response may have a common format for the responses. The mappings 235 may hence map different formats of messages that include responses from the provider systems 104. Similarly, messages that represent provider objects may have different formats depending on a source of the provider objects, whether the provider objects comprise an NDC offer or an Edifact recommendation, and the like, while harmonized objects representing the provider objects may have a common format for the provider objects. The mappings 235 may hence map different formats of messages and/or provider objects to the common format for the provider objects.

In particular, the mapping 235 may indicate fields of harmonized objects that correspond to respective fields of the messages. For example, message data of a given type, such as message data that represents provider object data, may be at a given field of a message; similarly, a harmonized object may include a corresponding given field where the message data is to be stored.

The mappings 235 may indicate correspondences between such fields of the messages and the harmonized objects such that given data from fields of the messages are used to populate given corresponding fields of the harmonized objects. In a particular example, a provider object of a message that represents a flight from an originating location to a destination location may have fields for the airline, the flight number, the originating location, the destination location, the date and the time of the flight; a corresponding harmonized object may have similar fields which are mapped to the fields of the provider object via a mapping 235. Furthermore, a message that includes a response may have data and/or metadata which may be particular to the message and/or indicative of an associated request that generated the response, such as geographic location from which the associated request originated, a time and/or date of the associated request (and/or the message), and the like; in some examples, a mapping may be further between fields of a harmonized object that is to be populated with metadata, and metadata of a message.

In general, the mappings 235 are preconfigured at the memory 222. Put another way, the mapping 235 is generated assuming that subsets of the messages, for which a given mapping 235 is generated, have a consistent (and/or same) format (e.g. messages of a given type from a given source may have a same format). However, it is understood that messages of different sources and/or of different types may have different formats, and that a mapping 235 is provided for each subset of the messages.

Hence, while only one mapping 235 is depicted, the memory 222 may store different mappings 235 for different message formats and/or different message types. For example, while only one provider system 104 is described herein, the computing device 130 may be communicating with more than one provider system 104 (e.g. of different airlines), which may each generate and/or provide respective messages (e.g. provider objects) of different formats. Alternatively, a given provider system 104 may generate and/or provide messages (e.g. provider objects) having different formats for different types of items (e.g. flight offers, lounge offers, premium seat offers, and the like). In general, the memory 222 may store a respective mapping 235 for each type of message that may be received.

However, the harmonized objects that are generated may have a consistent and/or same format for a given harmonized object type. For example, one type of harmonized object may correspond to responses for provider objects received in the messages. Another type of harmonized object may correspond to provider objects received in the messages. Different mappings 235 may be used for each given harmonized object type, and more than one mapping 235 may be for a given message type. Hence, harmonized objects representing messages having different formats for a same message type are generated in a common harmonized object format.

Formats of the messages may depend on capability of the provider systems 104 and/or sources of the messages, and be in an NDC format or a GDS format, and the like, and/or be in any suitable format. Indeed, the format of the messages may depend on whether the provider systems 104 and/or sources of the messages are operating according to NDC or GDS based data exchange, and/or another type of data exchange format. The mappings 235 may hence be for translating NDC formatted messages of a given type, and GDS formatted messages of the given type to a common harmonized format.

Execution of the application 223, as will be discussed below, configures the computing device 130 to: receive messages associated with provider objects representing items provided by one or more provider systems 104, the messages having more than one format; and store, at the one or more memories 135, harmonized objects corresponding to the messages, the harmonized objects generated using the one or more mappings 235 of harmonized data of the harmonized objects to message data of the messages, the harmonized objects having common formats for a given harmonized object type.

The computing device 140 will next be described with respect to FIG. 3. As shown in FIG. 3, the computing device 140 includes at least one controller 320, a memory 322 storing an application 323, and a communication interface 328; the controller 320, the memory 322 and the communication interface 328 are respectively similar to the controller 220, the memory 222 and the communication interface 228, as described above.

The components of the computing device 140 mentioned above can be deployed in a single enclosure, or in a distributed format. In some examples, therefore, the computing device 140 includes a plurality of processors, either sharing the memory 322 and communication interface 328, or each having distinct associated memories and communication interfaces. While not depicted, the memory 322 may include the memory 135 (and/or a portion thereof). However, in other examples, memory 135 may be external to the computing device 140, and accessible to the controller 320, for example via the communication interface 328. Indeed, the memory 135 may be distributed between and/or shared with the computing device 130.

The memory 322 also stores a plurality of computer-readable programming instructions, executable by the controller 320, in the form of various applications, including the application 323. As will be understood by those skilled in the art, the controller 320 executes the instructions of the application 323 (and any other suitable applications) in order to perform various actions defined by the instructions contained therein. In the description below, the controller 320, and more generally the computing device 140, are said to be configured to perform those actions. It will be understood that they are so configured via the execution (by the controller 320) of the instructions of the applications stored in memory 322.

As depicted, the memory 322 further stores one or more machine learning training modules 335 (interchangeably referred to hereafter, collectively, as the modules 335 and, generically, as a module 335) which may be components of the application 323 and/or stored separately from the application 323. The modules 335 are generally for training machine learning models to perform a given respective function based on the harmonized objects stored at the memory 135. Hence, a module 335 may interchangeably be referred to as a machine learning training algorithm. A module 335 may include a given feature extractor and a given machine learning module. A given feature extractor may be configured to extract from the harmonized objects, given machine learning training data for training the given machine learning model, as described in more detail below. As described above the caching server 121 may be implementing machine learning models for example for storing received provider objects at the memory 126, and/or responding to request for provider objects using provider objects stored at the memory 126. The memory 322 may store a corresponding module 335 for each machine learning model implemented at the caching server 121.

The machine learning module 335 may include machine learning and/or deep-learning and/or neural network-based models and/or models, and the like including, but are not limited to: a generalized linear regression model; a random forest model; a support vector machine model; a gradient boosting regression model; a decision tree model; a generalized additive model; evolutionary programming models; Bayesian inference models, reinforcement learning models, and the like. However, any suitable machine learning model and/or deep learning model and/or neural network model is within the scope of present examples.

Execution of the application 323, as will be discussed below, configure the computing device 140 to: extract, from the harmonized objects, for a given machine learning model, given machine learning training data; generate, for the given machine learning model, using the given machine learning training data, at least one machine learning classifier; and provide the at least one machine learning classifier to the given machine learning model at a server (e.g. the caching server 121) configured to implement the given machine learning model on received provider objects.

While the structure of the provider system 104, the client device 112, and the servers 120, 121 is not described in detail, the provider system 104, the client device 112, and the servers 120, 121 are understood to have a similar structure as the computing devices 130, 140, but adapted for the respective functionality of the provider system 104, the client device 112, and the servers 120, 121.

Figure 4:
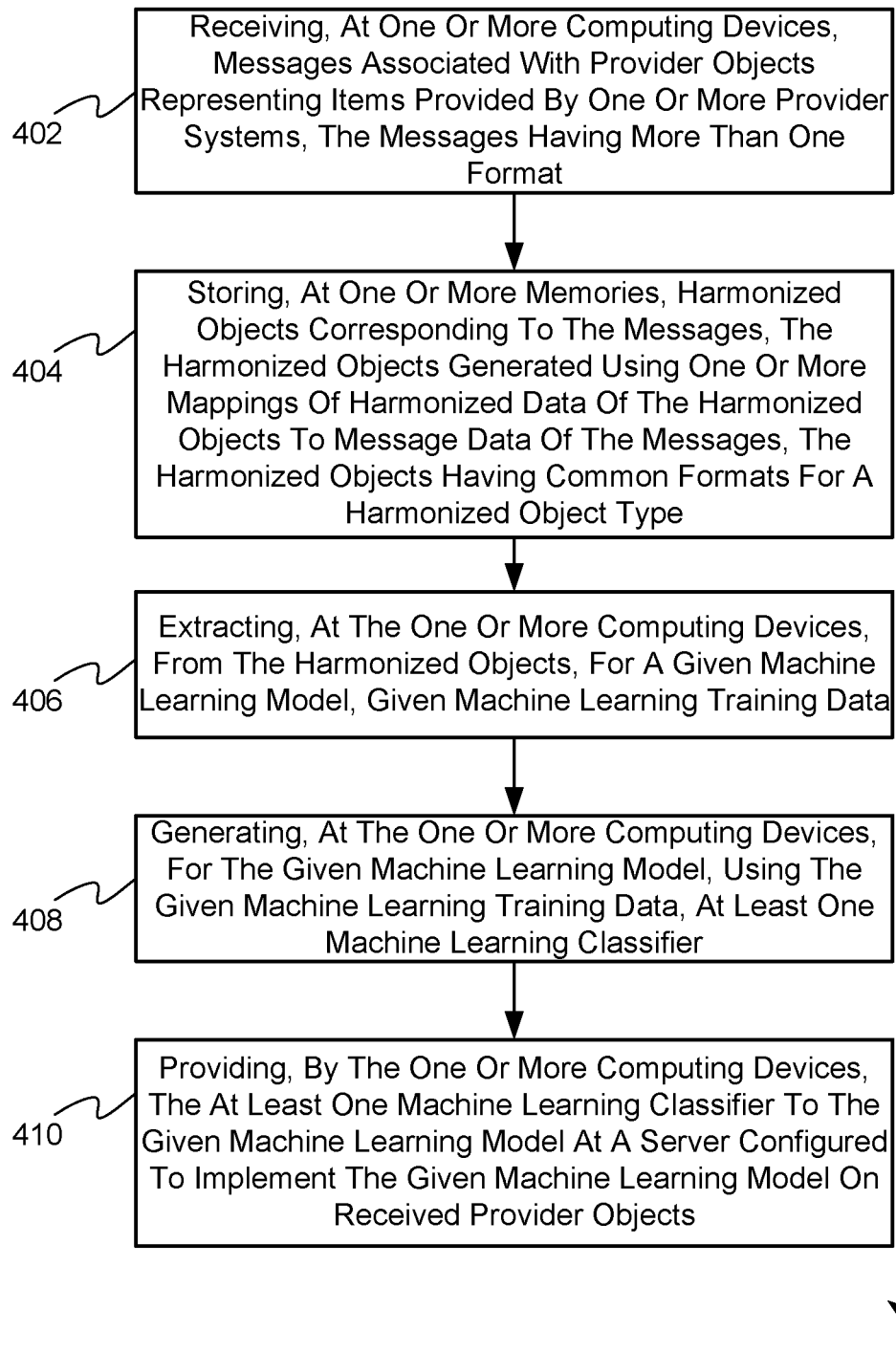
FIG. 4 depicts a method for training machine learning models using messages associated with provider objects, according to non-limiting examples.

Attention is now directed to FIG. 4 which depicts a flowchart representative of a method 400 for training machine learning models using messages associated with provider objects. The operations of the method 400 of FIG. 3 correspond to machine readable instructions that are executed by the computing devices 130, 140, and specifically the controllers 220, 320. In the illustrated example, the instructions represented by the blocks of FIG. 3 are stored at the memories 222, 322 for example, as the applications 223, 323 (and/or the modules 335). The method 400 of FIG. 4 is one way in which the controllers 220, 320 and/or the computing devices 130, 140 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 3 may be implemented on variations of the system 100 of FIG. 1, as well. In particular, while the method 400 is described as being implemented by the computing devices 130, 140, the functionality of the computing devices 130, 140 may be combined into a single computing device which implements the method 400.

Alternatively, the functionality of the computing devices 130, 140 may be distributed between a plurality of computing devices which implement the method 400; for example, a different computing device may be used to implement each module 335.

At a block 402, the controller 220 and/or the computing device 130 receives messages associated with provider objects representing items provided by one or more provider systems 104, the messages having more than one format. The messages may be associated with provider objects which may comprise NDC offers, or Edifact recommendations (e.g. according to a GDS format), and the like, and/or be in any suitable format; the format of the messages may hence depend on capability of the provider systems 104 and/or sources of the messages, and/or whether the provider systems 104 and/or sources of the messages are operating according to a NDC or GDS based data exchange format, and/or another type of data exchange format.

Furthermore, the messages may be received from the event hub device 127, the event hub device 127 comprising a proxy for at least the intermediation server 120, the intermediation server 120 configured to respond to requests for the items provided by the one or more provider systems 104. However, the messages may be received from any suitable source of the messages in the system 100. Indeed, in some examples, the event hub device 127 may be optional, with the computing device 130 configured to receive the messages from the sources without use of the event hub device 127.

At a block 404, the controller 220 and/or the computing device 130 stores, at the one or more memories 135, harmonized objects corresponding to the messages, the harmonized objects generated using the one or more mappings 235 of harmonized data of the harmonized objects to message data of the messages, the harmonized objects having common formats for a given harmonized object type. The mappings 235 and generation of the harmonized data objects are described above.

In general, the controller 220 and/or the computing device 130 may continue to implement the block 402 and the block 404 on an on-going basis such that the memory 135 is updated on an on-going basis, for example during implementation of the remainder of the method 400.

In general, as described above, the harmonized objects may correspond to messages which may indicate one or more of: given requests for the items provided by the one or more provider systems 104; the provider objects; successful associated responses for the items; and the like. However, the harmonized objects are harmonized to common formats for a given harmonized object type, as described above.

The harmonized objects may further include metadata associated with the messages. For example, a message (e.g. a response) may be in provided in response to a request from a particular geographic location which may be stored at an associated harmonized object based on a respective mapping 235, as described above.

The harmonized objects stored at the memory 135 may hence represent the effect of providing different provider objects in response to requests received from the client device 112. As such, the harmonized objects may be used as machine learning training data, with given harmonized objects being used as machine learning training data for a given machine learning model, for example depending on the functionality of the given machine learning model.

Hence, at a block 406, the controller 320 and/or the computing device 140 extracts, from the harmonized objects, for a given machine learning model, given machine learning training data. For example, for the given machine learning model, given harmonized data of the harmonized objects may be identified as the given machine learning training data.

For example, a given machine learning model may be for one or more of: categorizing a received provider object according to reusability; categorizing the received provider object according to context characteristics; determining a criticality of a received provider object; and combining two or more items of the received provider objects. Hence, depending on the functionality of the machine learning model being trained, different harmonized objects may be used as machine learning training data. Particular modules 335 may hence be configured to extract particular harmonized objects from the memory 135 to train an associated machine learning model.

In one example, a given machine learning model may be for categorizing a received provider object according to reusability, which may include, but is not limited to: categorizing the received provider object by one or more of respective characteristics of the received provider object and respective combinations of one or more respective items represented by the received provider object (e.g. the respective items comprising products provided by the provider systems 104; however the respective items represented by the provider objects may correspond to criteria included in a request from the client device 112). For example, the characteristics used to categorize the received provider object may be characteristics of the received provider object itself, such as a flight for a given day, as represented by the received provider object, whether the received provider object is for a particular class of seat of the flight (e.g. economy, premium, business, first, and the like), a number of bags included for the flight, and the like. Hence, for example, the received provider object for a given flight on a given day, for a given class and a given number of bags may be categorized as reusable for requests for the flight on the given day, for the given class and the given number of bags; however, the received provider object may not be reusable for requests for the flight on the given day, for the given class but for a different number of bags.

In another example, a given machine learning model may be for categorizing a received provider object according to context characteristics, which may include, but is not limited to: categorizing the received provider object by one or more of a respective context in which a respective provider object was requested, a customization, a geographic location, a customer type, and a category of respective items represented by the received provider object. In particular, provider objects provided by a provider system 104 may be customized according to certain types of characteristics of a request for the provider object, such as the context characteristics listed above. For example, a given price of a provider object and/or items offered by a provider object, and the like, may be customized according to context characteristics of a request for the provider object (e.g. a request that originates in England for a given flight may result in a provider object that is different from a request, for the given flight, that originates in France). Put another way, a provider system 104 may implement a set of rules, and/or context logic, when providing a provider object in response to a request; categorizing a received provider object according to context characteristics may include categorizing the received provider object in a manner that simulates (and the like) the set of rules/or context logic implemented by the provider system 104. Such categorization may alternatively be referred to as segmentation in that a provider system 104 may provide provider objects in a segmented and/or contextual manner.

In yet another example, a given machine learning model may be for determining a validity and/or a criticality of a received provider object which may include, but is not limited to, determining whether the received provider object is currently valid. For example, a received provider object may include a time-to-live (TTL) field which generally indicates a length of time that a provider designates the received provider object to be valid (e.g. a length of time, such as 30 minutes, an offered price for a flight may be valid). However received provider objects may be valid for longer than the length of time of the TTL field; for example, a flight associated with the received provider object may be six months from a date that the received provider was generated, and an offered price may not change and/or expire for a given time period that is longer than the length of time of the TTL field (e.g. four months), and/or the given time period may be based on loads and/or seasonality. Hence, in these examples, the given machine learning model may determine criticality of a received provider object by determining that a current time does not exceed one or more of an estimated expiry time and an estimated (or non-estimated) TTL value of a received provider object.

At a block 408, the controller 320 and/or the computing device 140 generates, for the given machine learning model, using the given machine learning training data, at least one machine learning classifier. In particular, as described above, a response message generally includes data and/or metadata corresponding to a request that resulted in the response. Hence, a message may include both "input" (e.g. the request) that used by the provider system 104 to generate a response, and "output" (e.g. the response) that was the result of the "input". Hence, a harmonized object may also generally include such "input" and "output", in a harmonized format, and may be used to train a given machine learning model. In particular, as will be described in more detail below, the machine learning training computing device 140 may include respective feature extractors for different machine learning models that are being trained, and the feature extractors may be configured to extract particular input and output from the harmonized objects which pertain the functionality of a machine learning model. Put another way, the given machine learning training data may comprise input and output extracted from the messages, the input comprising data from a message corresponding to a response for the items provided by the one or more provider systems, and the output comprising respective data corresponding to a request that resulted in the response.

For example, for a machine learning model for categorizing a received provider object according to reusability, input and output pertaining to reusability may be extracted from the harmonized objects and used to train a reusability machine learning model. For example, machine learning classifiers for different reusability types of provider objects may be generated from the training.

In another example, for a machine learning model for categorizing a received provider object according to context characteristics, input and output pertaining to context characteristics may be extracted from the harmonized objects and used to train a context characteristic machine learning model. For example, machine learning classifiers for different context characteristic types of provider objects may be generated from the training.

In another example, for a machine learning model for combining two or more items of the received provider objects, input and output pertaining to combining two or more items may be extracted from the harmonized objects and used to train a context characteristic machine learning model. For example, machine learning classifiers for different combinations of items may be generated from the training.

In another example, for a machine learning model for determining a validity and/or criticality of a received provider object, input and output pertaining to validity and/or criticality may be extracted from the harmonized objects and used to train a criticality machine learning model. Machine learning classifiers for criticality and/or validity of different provider objects may be generated from the training.

At a block 410, the controller 320 and/or the computing device 140 provides the at least one machine learning classifier to the given machine learning model at a server (e.g. the caching server 121) configured to implement the given machine learning model on received provider objects. For example, the caching server 121 may use the machine learning classifiers generated for the different machine learning models when implementing the different machine learning models on received provider objects, as described in more detail below.

The block 406, the block 408 and the block 410 may be implemented periodically and/or in parallel with the block 402 and the block 404, such that machine learning classifiers are periodically generated and provided to the caching server 121.

Similarly, while aspects of the method 400 have been generally described with respect to one machine learning model, the method 400 may be implemented for a plurality of machine learning models. For example, the method 400 may further comprise the controller 320 and/or the computing device 140: extracting (e.g. at the block 406), from the harmonized objects, for a plurality of given machine learning models, given respective machine learning training data; generating (e.g. at the block 408), for the plurality of given machine learning models, using the given respective machine learning training data, at least one respective machine learning classifier; and providing (e.g. at the block 410), by the one or more computing devices, the at least one respective machine learning classifier to the plurality of given machine learning models at one or more servers (e.g. the caching server 121) configured to implement the plurality of given machine learning models on the received provider objects.

Figure 5:
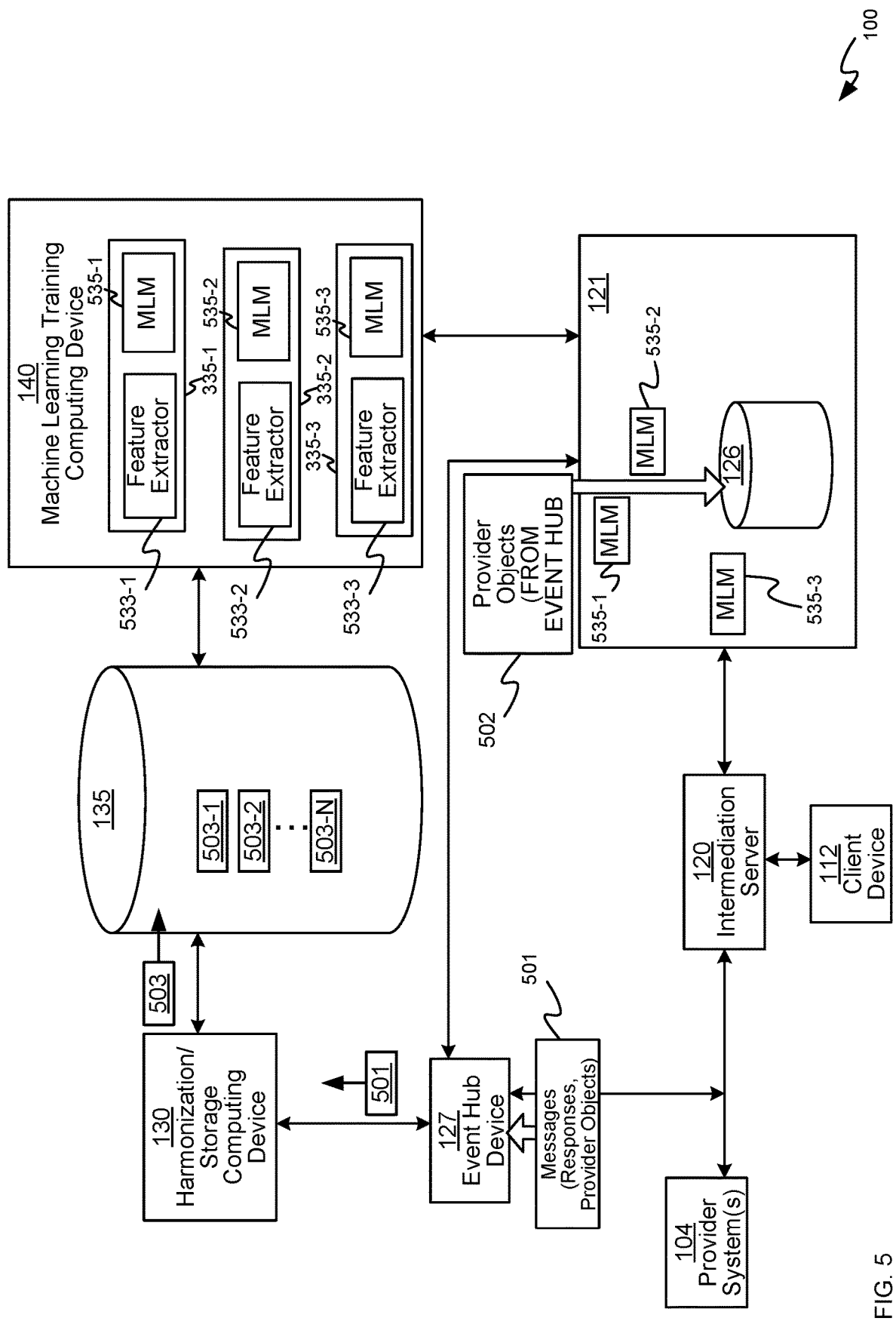
FIG. 5 depicts messages and/or provider objects being received in the system of FIG. 1, according to non-limiting examples.

An example of the method 400 is next described. Attention is first directed to FIG. 5, which depicts the system 100, but without the network 116. Rather FIG. 5 shows communication links between the components of the system 100 which are represented as double ended-arrows therebetween; such communication links may include the network 116. Otherwise, FIG. 5 is similar to FIG. 1, with like components having like numbers. In particular, FIG. 5, together with FIG. 6, depicts an example of the block 402 and the block 404 of the method 400.

In FIG. 5, the event hub device 127 is receiving messages 501 which, as depicted, may include responses received from the provider system 104, and provider objects, and the like. The messages 501 may be received from any suitable source of in the system 100, as described above. The event hub device 127 transmits the messages 501 to the computing device 130. As depicted, the event hub device 127 further provides provider objects 502 of the messages 501 to the caching server 121. While the provider objects 502 are depicted as being different from the messages 501, the provider objects 502 may be received at the caching server 121 in the form of the messages 501.

The computing device 130 receives (e.g. at the block 402 of the method 400) the messages 501 and generates harmonized objects 503 from the messages 501 and the mappings 235. In some examples, the messages 501 and/or the harmonized objects 503 may be in an eXtensible Markup Language (XML) format, however the messages 501 and the harmonized objects 503 may be in any suitable respective format.

Figure 6:
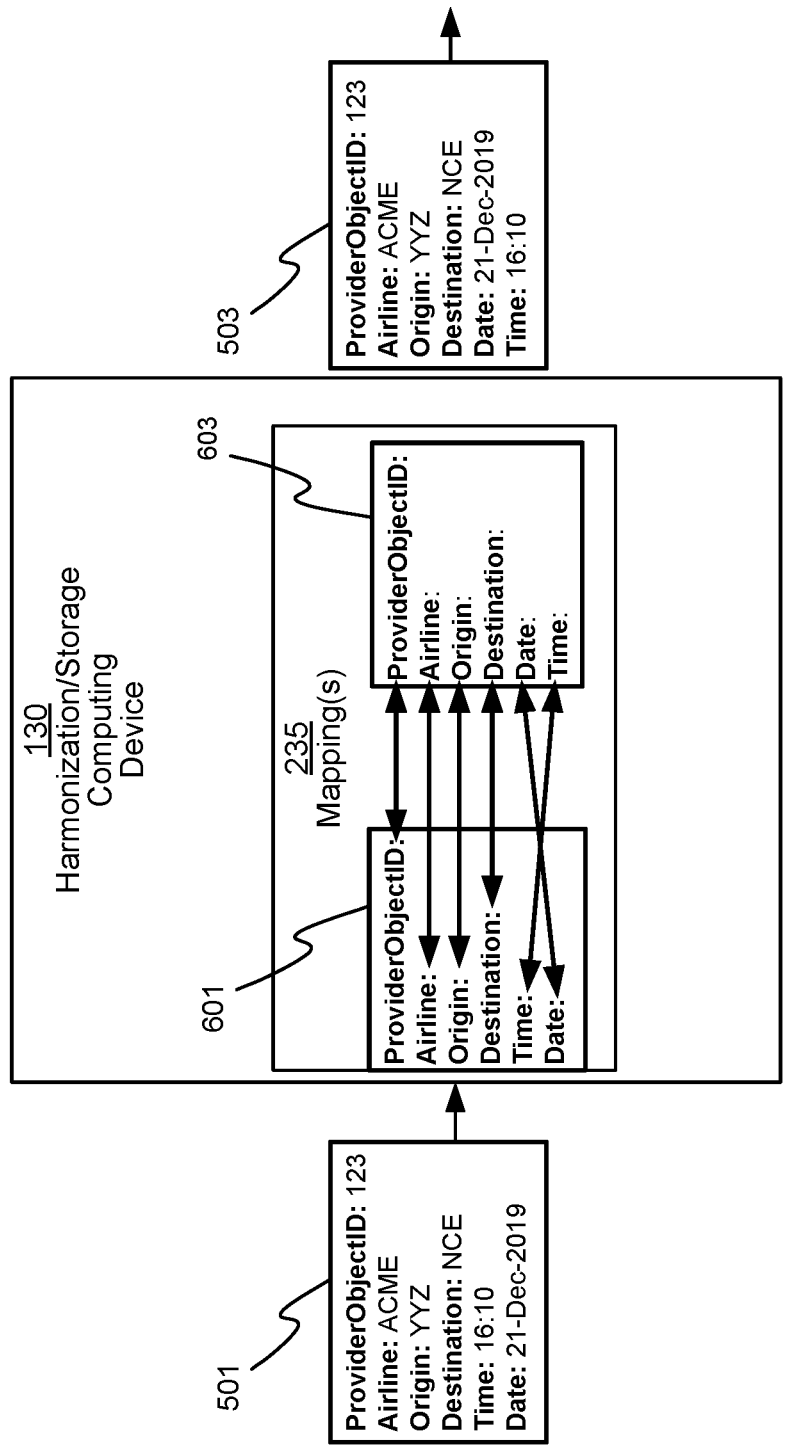
FIG. 6 depicts mapping between messages and a harmonized object, according to non-limiting examples.

Attention is briefly directed to FIG. 6 which depicts an example of the computing device 130 receiving a message 501 and generating a harmonized object 503 from the message 501 using the mappings 235. In particular, a given mapping 235 is depicted that includes a mapping of fields 601 of a given message type (e.g. a provider object for a flight) to fields 603 of corresponding harmonized objects 503.

As depicted, the fields 601 of an example message 501 (e.g., that includes a provider object for a flight and corresponds to a response from the provider system 104), include a "ProviderObjectID" (e.g. a provider object identifier, for example as generated by the provided system 104), "Airline", "Origin", "Destination", "Time" and "Date". The depicted mapping 235 maps the field "Airline" of the fields 601, to the field "Airline" of the fields 603 of a corresponding harmonized object 503, as graphically represented by an arrow therebetween (different from the arrows of the communication links). Similar mappings of the other fields 601 to corresponding fields 603 are depicted. In particular, the fields "Date" and "Time" for each of the fields 601, 603 have different positions for the example messages 501 and the example harmonized objects 503; for example, in the harmonized objects 503, the positions of the fields "Date" and "Time" are reversed as compared to the message 501. While such an example is relatively simplistic, it is understood that the format differences between the messages 501 and the harmonized objects 503 may be much more complex. For example, dates, times, airline names, etc. may be in different formats, and the mapping 235 may include data for translating the message data into a common format of the harmonized object data. Furthermore, the message 501 generally includes data (e.g. which may also be in the field 601) from a request that resulted in the message 501.

Furthermore, when messages 501 are received that include provider objects in different formats, the mappings 235 may be used to generate corresponding harmonized objects 503 having a common format for provider objects.

Regardless, the message data from the messages 501 is used to populate corresponding fields of the harmonized objects 503, for a harmonized object type. Indeed, the computing device 130 may be further configured to determine a type of a message 501 and select a corresponding mapping 235 to generate a corresponding harmonized object 503. For example, the computing device 130 may be configured to categorize the messages 501 based on a format thereof and/or data of the messages 501 and select a mapping 235 accordingly.

Returning to FIG. 5, the computing device 130 stores (e.g. at the block 404 of the method 400) the harmonized objects 503 at the memory 135, for example on an on-going basis and/or as messages 501 are received and/or as harmonized objects 503 are generated.

As depicted, the memory 135 is storing a plurality of harmonized objects 503-1, 503-2 . . . 503-N (e.g. with "N" being an integer of any suitable value). While not depicted, the harmonized objects 503 may be stored according to type.

As depicted, the computing device 140 comprises a plurality of machine learning modules 335-1, 335-2, 335-3. While three modules 335 are depicted, the computing device 140 may store any suitable number of modules 335. In particular, the computing device 140 may store a module 335 for each machine learning model that is to be trained using the harmonized objects 503.

As depicted, each module 335 comprises a respective feature extractor 533-1, 533-2, 533-3 (interchangeably referred to hereafter, collectively, as the feature extractors 533 and, generically, as a feature extractor 533) and a given machine learning model 535-1, 535-2, 535-3 (interchangeably referred to hereafter, collectively, as the machine learning models 535 and, generically, as a machine learning model 535).

A given feature extractor 533 may be configured to extract given machine learning training data (e.g. "input" and "output") from the harmonized objects 503, for training a given machine learning model 535. For example, the harmonized objects 503 provide an overall training dataset for the machine learning models 535 (e.g. a harmonized object 503 may comprise a record with a plurality of fields that correspond to input and output for training the machine learning models 535). A given feature extractor 533 may extract features from the training dataset (e.g. specific fields which are converted to a format that can be used with a given machine learning model 535) depending on an objective and/or a functionality of the given machine learning model 535 being trained; such features are hence used to train a machine learning model 535.

The type of given machine learning training data that is extracted from the harmonized objects 503 by a given feature extractor 533 may generally depend on the functionality of the machine learning model 535 being trained. Examples of harmonized objects 503 and/or given machine learning training data that may be used as inputs and outputs used to train specific machine learning models 535 have been described above. However, any suitable harmonized objects 503 and/or given machine learning training data may be extracted by a given feature extractor 533 and used to train a machine learning model 535. Indeed, the harmonized objects 503 and/or given machine learning training data may be extracted by a given feature extractor 533, which may be preconfigured at the computing device 140 and/or at a module 335.

For example, as depicted, the machine learning models 535-1, 535-2 may be implemented at the caching server 121 to categorize the provider objects 502 being stored at the memory 126. In some examples, machine learning model 535-1 may be to categorize a received provider object 502 according to reusability; hence, for example, the machine learning model 525-1 may comprise a reusability determining machine learning model. In some examples, the machine learning model 535-2 may be to categorize a received provider object 502 according to context characteristics; hence, for example, the machine learning model 525-2 may comprise a context determining machine learning model. Regardless, the provider objects 502 are generally stored at the cache 126 as categorized, as described below.

The machine learning model 535-3 may be to determine a criticality of a received provider object 502 stored at the memory 126 (e.g. as categorized) when responding to a request for a provider object from the client device 112. For example, the machine learning model 535-3 may comprise a criticality determining machine learning model and, in particular, a validity estimation machine learning model configured to determine whether a provider object 502 is estimated to be currently valid. For example, the machine learning model 535-3 may be configured to determine that a current time does not exceed one or more of an estimated expiry time and an estimated TTL value of the provider object.

Figure 7:
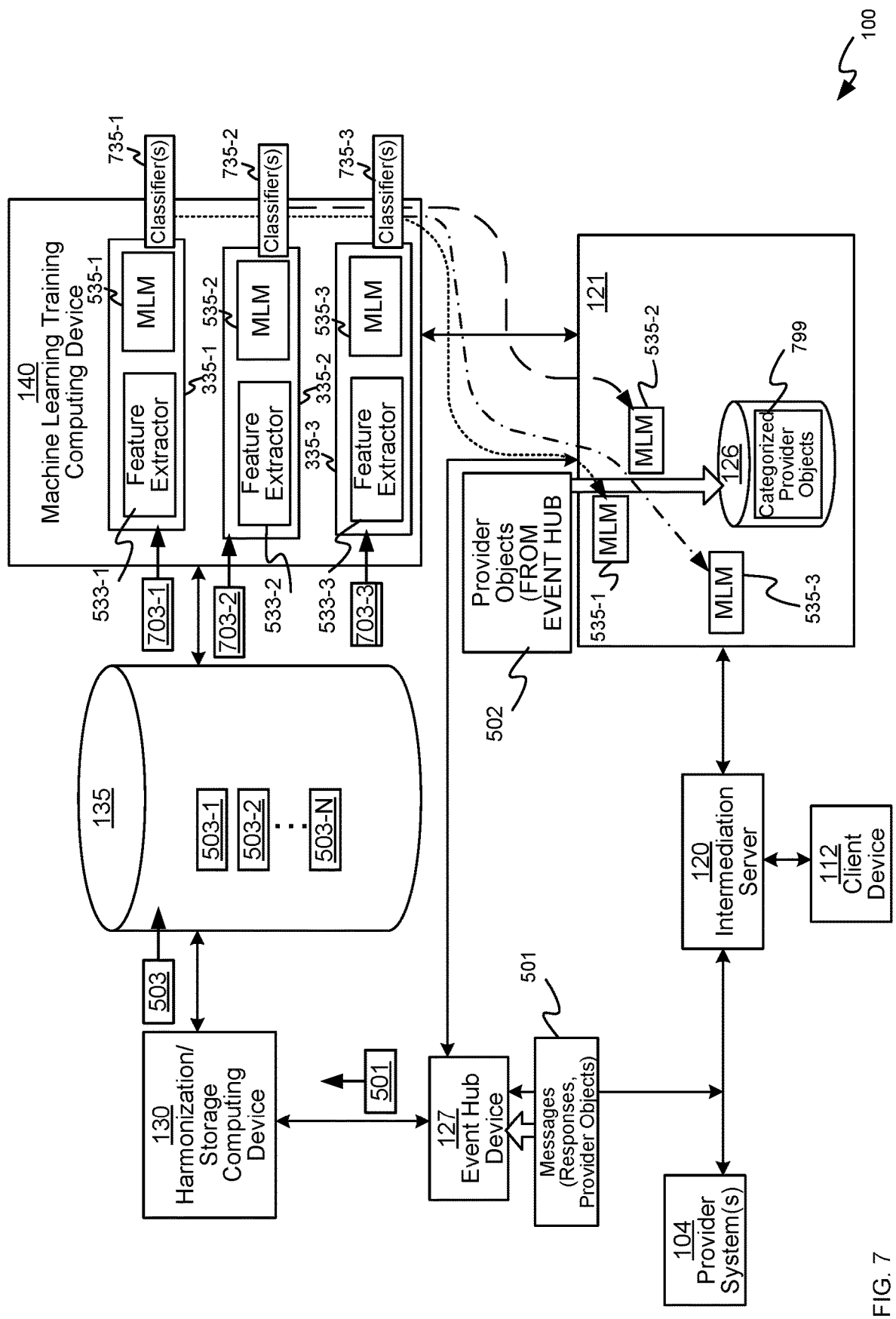
FIG. 7 depicts machine learning models being trained in the system of FIG. 1, according to non-limiting examples.

Attention is next directed to FIG. 7, which is substantially similar to FIG. 5, with like components having like numbers. In particular, FIG. 7, depicts an example of the block 406, the block 408 and the block 410 of the method 400.

In FIG. 7, the computing device 140 is depicted as extracting (e.g. at the block 406 of the method 400, and for example using the feature extractors 533), from the harmonized objects 503 stored at the memory 135, for a given machine learning model 535, given machine learning training data 703-1, 703-2, 703-3 (interchangeably referred to hereafter, collectively, as machine learning training data 703 and, generically, as a set of machine learning training data 703). Each set of machine learning training data 703 includes a subset of the harmonized objects 503 stored at the memory 135 that is selected based on the functionality of the respective machine learning model 535 that is being trained by a particular module 335.

The respective sets of machine learning training data 703 are used by the modules 335 to train a respective machine learning model 535 to generate (e.g. at the block 408 of the method 400) one or more respective machine learning classifiers 735-1, 735-2, 735-3 3 (interchangeably referred to hereafter, collectively, as the machine learning classifiers 735 and, generically, as a machine learning classifier 735).

While FIG. 7 depicts one machine learning classifier 735 being generated by each of the modules 335, each module 335 may generate more than one machine learning classifier 735, for example for categorizing the provider objects 502 according to different categories. For example, when the machine learning model 535-1 is for categorizing the provider objects 502 according to reusability, a machine learning classifier 735-1 may be generated for a plurality of categories of reusability. Similarly, when the machine learning model 535-2 is for categorizing the provider objects 502 according to context characteristics, a machine learning classifier 735-2 may be generated for a plurality of categories of context characteristics.

As depicted, the computing device 140 provides (e.g. at the block 410 of the method 400) the machine learning classifiers 735 corresponding to respective given machine learning models 535 at the caching server 121. For example, the machine learning classifier 735-1 is provided to the machine learning model 535-1 at the caching server 121, the machine learning classifier 735-2 is provided to the machined learning model 535-2 at the caching server 121, and the machine learning classifier 735-3 is provided to the machine learning model 535-3 at the caching server 121 (e.g. the computing device 140 transmits the machine learning classifiers 735 to the caching server 121). The caching server 121 implements the given machine learning models 535 using the machine learning classifiers 735 on the received provider objects 502. For example, as depicted, the machine learning classifiers 735 are transmitted to the caching server 121 via communication links between the computing device 140 and the caching server 121. For clarity, the lines used to show transmission of the machine learning classifiers 735 to the caching server 121 are depicted differently (e.g. using different dashed styles).

As described above, the functionality of the one or more servers 120 is described in Applicant's co-pending application titled "DEVICE, SYSTEM AND METHOD FOR PROVIDING PROVIDER OBJECTS FROM A CACHE", having an applicant docket number PT2165WWDR. In particular, the one or more servers 120 may implement the machine learning models 535-1, 535-2 to categorize the provider objects 502 according to reusability and context characteristics, and store the provider objects in the memory 126, for example as categorized provider objects 799. The categorized provider objects 799 may later be used to respond to requests from the client device 112, by selecting categorized provider objects 799 stored at the memory 126 that meet criteria of a request, for example based at least in part on the categorization by the machine learning models 535-1, 535-2. The machine learning model 535-3 may be used to further categorize the categorized provider objects 799, stored at the memory 126, and that meet the criteria of a request, by criticality and/or validity when responding to the request. As the machine learning models 535 have been "trained" via the classifiers 735, the machine learning models 535 may be used to respond to a request by the client device 112 using the categorized provider objects 799 rather than request provider objects from the provider system 104, which may reduce time in responding to a request from the client device 112.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
    receiving, at one or more computing devices, messages associated with provider objects representing items provided by one or more provider systems, the messages having more than one format;
    storing, at one or more memories, harmonized objects corresponding to the messages, the harmonized objects generated using one or more mappings of harmonized data of the harmonized objects to message data of the messages, the harmonized objects having common formats for a harmonized object type;
    extracting, at the one or more computing devices, from the harmonized objects, for a given machine learning model, given machine learning training data;
    generating, at the one or more computing devices, for the given machine learning model, using the given machine learning training data, at least one machine learning classifier; and
    providing, by the one or more computing devices, the at least one machine learning classifier to the given machine learning model at a server configured to implement the given machine learning model on received provider objects,
    wherein the given machine learning training data comprises input and output extracted from the messages, the input comprising data from a message corresponding to a response for the items provided by the one or more provider systems, and the output comprising respective data corresponding to a request that resulted in the response.

2. The method of claim 1, wherein, for the given machine learning model, given harmonized data of the harmonized objects is identified as the given machine learning training data.

3. The method of claim 1, further comprising:
    extracting, at the one or more computing devices, from the harmonized objects, for a plurality of given machine learning models, given respective machine learning training data;
    generating, at the one or more computing devices, for the plurality of given machine learning models, using the given respective machine learning training data, at least one respective machine learning classifier; and
    providing, by the one or more computing devices, the at least one respective machine learning classifier to the plurality of given machine learning models at one or more servers configured to implement the plurality of given machine learning models on the received provider objects.

4. The method of claim 1, wherein the provider objects comprise one or more of New Distribution Capability (NDC) offers and Edifact recommendations.

5. The method of claim 1, wherein the given machine learning model is for one or more of:
categorizing a received provider object according to reusability;
categorizing the received provider object according to context characteristics;
determining a criticality of a received provider object; and
combining two or more items of the received provider objects.

6. The method of claim 1, wherein the messages are received from an event hub device comprising a proxy for at least a server configured to respond to requests for the items provided by the one or more provider systems.

7. A computing device comprising:
one or more memories;
a communication interface; and
a controller configured to:
receive, via the communication interface, messages associated with provider objects representing items provided by one or more provider systems, the messages having more than one format;
store, at the one or more memories, harmonized objects corresponding to the messages, the harmonized objects generated using one or more mappings of harmonized data of the harmonized objects to message data of the messages, the harmonized objects having common formats for a harmonized object type;
extract, from the harmonized objects, for a given machine learning model, given machine learning training data;
generate, for the given machine learning model, using the given machine learning training data, at least one machine learning classifier; and
provide, via the communication interface, the at least one machine learning classifier to the given machine learning model at one or more servers configured to implement the given machine learning model on received provider objects,
wherein the given machine learning training data comprises input and output extracted from the messages, the input comprising data from a message corresponding to a response for the items provided by the one or more provider systems, and the output comprising respective data corresponding to a request that resulted in the response.

8. The computing device of claim 7, wherein, for the given machine learning model, given harmonized data of the harmonized objects is identified as the given machine learning training data.

9. The computing device of claim 7, wherein the controller is further configured to:
extract, from the harmonized objects, for a plurality of given machine learning models, given respective machine learning training data;
generate, for the plurality of given machine learning models, using the given respective machine learning training data, at least one respective machine learning classifier; and
provide, via the communication interface, the at least one respective machine learning classifier to the plurality of given machine learning models at one or more servers configured to implement the plurality of given machine learning models on the received provider objects.

10. The computing device of claim 7, wherein the provider objects comprise one or more of New Distribution Capability (NDC) offers and Edifact recommendations.

11. The computing device of claim 7, wherein the given machine learning model is for one or more of:
categorizing a received provider object according to reusability;
categorizing the received provider object according to context characteristics;
determining a criticality of a received provider object; and
combining two or more items of the received provider objects.

12. The computing device of claim 7, wherein the messages are received from an event hub device comprising a proxy for at least a server configured to respond to requests for the items provided by the one or more provider systems.

13. A non-transitory computer-readable medium storing a computer program, wherein execution of the computer program is for:
receiving, at one or more computing devices, messages associated with provider objects representing items provided by one or more provider systems, the messages having more than one format;
storing, at one or more memories, harmonized objects corresponding to the messages, the harmonized objects generated using one or more mappings of harmonized data of the harmonized objects to message data of the messages, the harmonized objects having common formats for a harmonized object type;
extracting, at the one or more computing devices, from the harmonized objects, for a given machine learning model, given machine learning training data;
generating, at the one or more computing devices, for the given machine learning model, using the given machine learning training data, at least one machine learning classifier; and
providing, by the one or more computing devices, the at least one machine learning classifier to the given machine learning model at a server configured to implement the given machine learning model on received provider objects,
wherein the given machine learning training data comprises input and output extracted from the messages, the input comprising data from a message corresponding to a response for the items provided by the one or more provider systems, and the output comprising respective data corresponding to a request that resulted in the response.

14. The non-transitory computer-readable medium of claim 13, wherein, for the given machine learning model, given harmonized data of the harmonized objects is identified as the given machine learning training data.

15. The non-transitory computer-readable medium of claim 13, wherein execution of the computer program is further for:
extracting, at the one or more computing devices, from the harmonized objects, for a plurality of given machine learning models, given respective machine learning training data;
generating, at the one or more computing devices, for the plurality of given machine learning models, using the given respective machine learning training data, at least one respective machine learning classifier; and providing, by the one or more computing devices, the at least one respective machine learning classifier to the plurality of given machine learning models at one or more servers configured to implement the plurality of given machine learning models on the received provider objects.

16. The non-transitory computer-readable medium of claim 13, wherein the provider objects comprise one or more of New Distribution Capability (NDC) offers and Edifact recommendations.

17. The non-transitory computer-readable medium of claim 13, wherein the given machine learning model is for one or more of:
categorizing a received provider object according to reusability;
categorizing the received provider object according to context characteristics;
determining a criticality of a received provider object; and
combining two or more items of the received provider objects.

18. A method comprising:
receiving, at one or more computing devices, messages associated with provider objects representing items provided by one or more provider systems, the messages having more than one format;
storing, at one or more memories, harmonized objects corresponding to the messages, the harmonized objects generated using one or more mappings of harmonized data of the harmonized objects to message data of the messages, the harmonized objects having common formats for a harmonized object type;
extracting, at the one or more computing devices, from the harmonized objects, for a given machine learning model, given machine learning training data;
generating, at the one or more computing devices, for the given machine learning model, using the given machine learning training data, at least one machine learning classifier; and
providing, by the one or more computing devices, the at least one machine learning classifier to the given machine learning model at a server configured to implement the given machine learning model on received provider objects,
wherein the provider objects comprise one or more of New Distribution Capability (NDC) offers and Edifact recommendations.

19. A computing device comprising:
one or more memories;
a communication interface; and
a controller configured to:
receive, via the communication interface, messages associated with provider objects representing items provided by one or more provider systems, the messages having more than one format;
store, at the one or more memories, harmonized objects corresponding to the messages, the harmonized objects generated using one or more mappings of harmonized data of the harmonized objects to message data of the messages, the harmonized objects having common formats for a harmonized object type;
extract, from the harmonized objects, for a given machine learning model, given machine learning training data;
generate, for the given machine learning model, using the given machine learning training data, at least one machine learning classifier; and
provide, via the communication interface, the at least one machine learning classifier to the given machine learning model at one or more servers configured to implement the given machine learning model on received provider objects,
wherein the provider objects comprise one or more of New Distribution Capability (NDC) offers and Edifact recommendations.

20. A non-transitory computer-readable medium storing a computer program, wherein execution of the computer program is for:
receiving, at one or more computing devices, messages associated with provider objects representing items provided by one or more provider systems, the messages having more than one format;
storing, at one or more memories, harmonized objects corresponding to the messages, the harmonized objects generated using one or more mappings of harmonized data of the harmonized objects to message data of the messages, the harmonized objects having common formats for a harmonized object type;
extracting, at the one or more computing devices, from the harmonized objects, for a given machine learning model, given machine learning training data;
generating, at the one or more computing devices, for the given machine learning model, using the given machine learning training data, at least one machine learning classifier; and
providing, by the one or more computing devices, the at least one machine learning classifier to the given machine learning model at a server configured to implement the given machine learning model on received provider objects,
wherein the provider objects comprise one or more of New Distribution Capability (NDC) offers and Edifact recommendations.

* * * * *